March 25, 1958 — D. V. TUTTLE — 2,828,401

INSERT OVEN

Filed June 14, 1954

INVENTOR.
DANIEL V. TUTTLE
BY L. A. Paley
Att'y.

United States Patent Office 2,828,401
Patented Mar. 25, 1958

2,828,401
INSERT OVEN

Daniel V. Tuttle, Kirkland, Ill., assignor, by mesne assignments, to Tuttle Electric Products, Inc., Kirkland, Ill., a corporation of Illinois Application June 14, 1954, Serial No. 436,293

2 Claims. (Cl. 219—35)

This invention relates to oven devices, and has reference more particularly to the combination with a large electric oven, of a smaller inserted oven of low wattage for small baking jobs.

In modern domestic cooking ranges there is a definite trend among manufacturers to produce ranges having large bake ovens with high wattage electric heating elements which are rather costly to operate for smaller baking jobs. Often it is desired to bake biscuits or a couple of pies and the use of a large electric oven is inefficient and requires an unnecessary amount of electric power.

An object of this invention therefore is to provide a small, low cost oven for use on small baking jobs.

Another object of the invention is to provide an insert oven which is uninsulated to lower its cost.

Another object of the invention is to provide a switch device for an insert oven in which the large heating element is disconnected and a smaller insert oven is connected at the time the small oven is inserted into the large oven.

A still further object of the invention is to provide a switch device for the insert oven which permits the use of a 220 v. current for the large oven and a 110 v. heating element in the insert oven: also to improve oven devices in other respects hereinafter specified and claimed.

Figure 1:
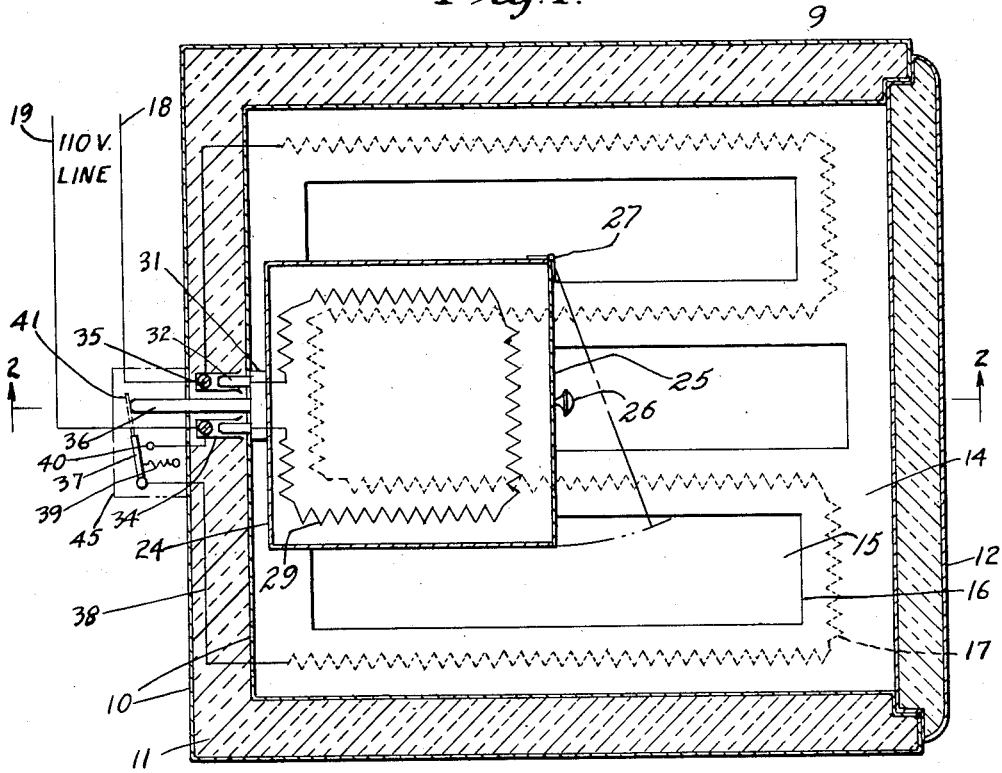
Figure 2:
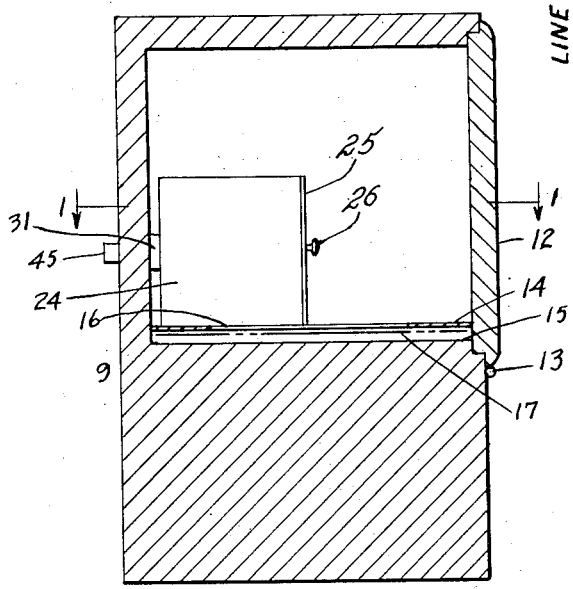
Figure 3:
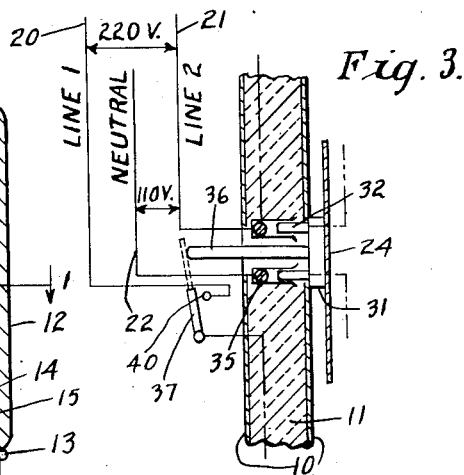

Reference is to be had to the accompanying drawing which forms part of this specification, in which:

Fig. 1 is a sectional plan view through the oven device taken on line 1—1 of Fig. 2, Fig. 2 is a sectional elevation through the oven device on a reduced scale and taken on line 2—2 of Fig. 1, and Fig. 3 is a sectional elevation of a 220 v. modified form of switching device for the ovens.

In the modern electric range 9, the walls of the range are usually composed of two spaced apart metal shells 10 having insulation 11 therebetween. A door 12 of the same general construction is usually pivoted by a hinge 13 along the bottom edge thereof. A bottom plate 14 is spaced above bottom 15 of the oven, and is provided with suitable openings 16 which permit the circulation of heated air in the oven. An electric heating element 17 of large wattage is positioned below plate 14 and is connected to power lines 18 and 19 which supply electric current to the heating element 17. This current may be 110 v. as shown in Fig. 1 or it may be 220 v. as shown in Fig. 3. In Fig. 3, power lines 20 and 21 are associated with a neutral line 22 for supplying the 220 v. current.

For an insert oven for use on small baking jobs, such as biscuits or a couple of pies, I use a metal shell 24 which is preferably uninsulated to insure a low cost. The shell 24 may have one cubic foot capacity, and is provided with a hinged door 25 having a knob 26, and hinges 27 extending along a vertical edge of the shell 24. The shell 24 rests directly on plate 14 and the door 25 can be swung open when the large oven door 12 is open. The insulation 11 of the large oven helps to conserve the heat produced in the insert oven by a low wattage electric heating element 29 contained in the shell 24 near the bottom thereof. It should be understood that both the large oven and the insert oven may be provided with conventional side support runners and shelves for supporting the baking vessels.

At the rear of the shell 24, I provide an insulator block 31 which supports a pair of conductor pins 32 which are attached to the heating element 29. A pair of sockets 34 is provided in the rear or other wall of the large oven 11, each of said sockets having a screw 35 for attachment of the power lines 18 and 19. A post 36 is attached to the block 31 and extends outwardly from the insert oven through and opening in the rear or other wall of the large oven. A switch 37 is provided in a power line 38 leading to the heating element 17, and a spring 39 normally tends to hold the switch 37 closed against a contact post 40. The switch 37 has a nonconductive extension 41 which is engaged by the post 36, so that the switch 37 is opened by the post 36 when the insert oven is placed in position in the large oven. A cap 45 of suitable construction is provided over the switch 37.

In the form of the device shown in Fig. 3, the same general switching mechanism is used as shown in Fig. 1, but the neutral line 22 is connected to a screw 35, and the switch 37 is in the power line 20 which with power line 21 produces a 220 v. power supply for the heating element 17. With this arrangement of the switch 37, the pins 32 are connected to one side of the power line and neutral line 22 to produce a 110 v. current in the heating element 29 of the insert oven. When the insert oven is removed from the large oven, a 220 v. power supply is connected to a heating element 17 of the large oven. This dual power supply makes it feasible to supply a large wattage when it is desired to use the big oven, and a small wattage when it is desired to use the small insert oven. In the claims to follow, the voltages may be any desired value.

I would state in conclusion that, while the illustrated example 5 constitute practical embodiments of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. A dual oven combination comprising a main oven having an electrical heater and auxiliary oven which is an independent unit with a separate electrical heater and is smaller than and loosely supported in the main oven at the bottom thereof for quick removal from and quick replacement in the main oven, each said oven being a separate walled enclosure defining an independent oven compartment which has an entrance thereto closed by a respective door, the oven compartment of the main oven being provided at the bottom with a horizontal surface on which the auxiliary oven is loosely supported as aforesaid and is horizontally slidable thereon, and an electrical connector through which current is suppliable to the heating unit of the auxiliary oven and comprising two separable parts located respectively on the main oven and on the auxiliary oven and separable from and interengageable with one another by sliding movement of the auxiliary oven on said horizontal surface, the auxiliary oven being bodily applicable to and removable from the said horizontal surface manually through the entrance of the main oven compartment while the door of the main oven compartment is in an open position, and the door of the auxiliary oven being accessible through the entrance of and openable and closeable while the auxiliary oven is within the main oven compartment and the door of the main compartment is in an open position.

2. A dual oven combination comprising a main oven with an electrical heater and an auxiliary oven which is an independent unit with a separate electrical heater and is loosely supported in the main oven at the bottom thereof for quick removal from and quick replacement in the main oven, each said oven being a separate walled enclosure defining an independent oven compartment which has an entrance thereto closed by a door, the oven compartment of the main oven being of substantially greater height and width and depth from front to rear than the auxiliary oven unit and provided at the bottom with a horizontal panel which underlies and is the sole support for the auxiliary oven unit and on which the auxiliary oven unit is loosely supported as aforesaid and is horizontally slidable thereon, said panel being substantially coextensive with the bottom of the main oven compartment and having the auxiliary oven unit located thereon at the rear of the main oven compartment and remote from the front and opposite sides of the main oven compartment, and an electrical connector through which current is suppliable to the heating unit of the auxiliary oven and comprising two separable parts located respectively on the main oven and on the auxiliary oven unit and separable from and interengageable with one another by sliding movement of the auxiliary oven unit on said horizontal panel, the auxiliary oven unit being readily applicable to and removable from said horizontal panel through the entrance of the main oven compartment while the door of the main oven compartment is in an open position.

References Cited in the file of this patent

UNITED STATES PATENTS

| | | |
|---|---|---|
| 1,052,894 | Cubitt | Feb. 11, 1913 |
| 1,179,340 | Smith | Apr. 11, 1916 |
| 2,024,386 | Phelps | Dec. 17, 1935 |
| 2,668,221 | McCormick | Feb. 2, 1954 |